Jan. 21, 1947.  J. W. SPEAKER  2,414,490
COLLAPSIBLE GRILL
Filed March 30, 1944
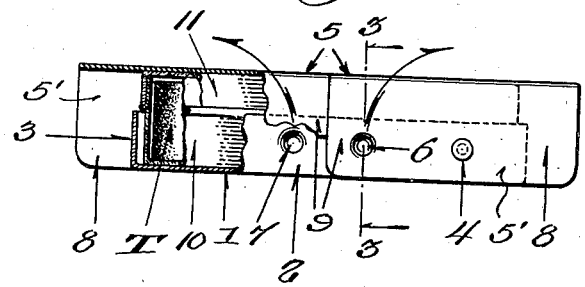
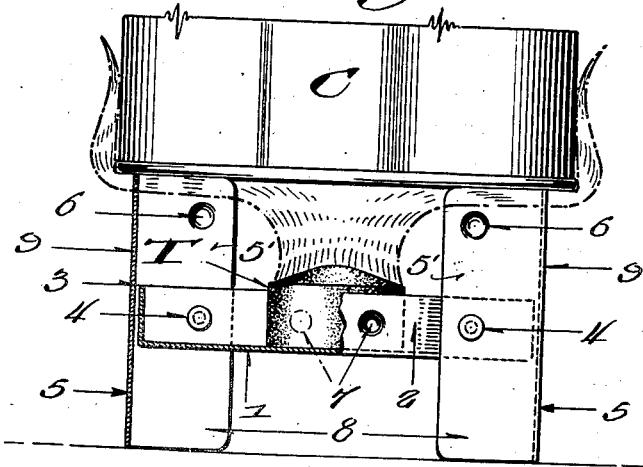
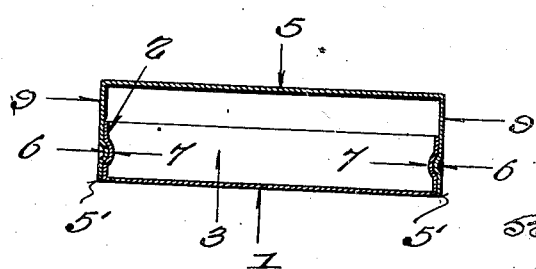
Inventor:
John W. Speaker Patented Jan. 21, 1947

2,414,490

UNITED STATES PATENT OFFICE 2,414,490

COLLAPSIBLE GRILL

John W. Speaker, Milwaukee, Wis.

Application March 30, 1944, Serial No. 528,715

3 Claims. (Cl. 126—43)

This invention pertains generally to heating grills, and more particularly to a collapsible grill for burning tablets of solidified fuel.

At the present time solidified fuel tablets are used extensively for heating purposes by the armed forces, sportsmen, industrial and medical workers, and others. These tablets are usually burned in a small grill upon which a receptacle, or other object to be heated, is supported. In most instances the grills and fuel are carried on the person, and, therefore, it is highly desirable that the kit be put up in as compact and convenient a form as possible.

To accomplish the foregoing it is the primary object of the present invention to provide an exceedingly simple, compact and inexpensive collapsible grill, which may also serve as a container or case for a substantial supply of heat tablets.

Incidental to the foregoing, a more specific object of the invention resides in the provision of a grill comprising, a pan to which a pair of cover members are pivotally connected to form a container when in collapsed position on the pan, and to serve as legs for the pan and supports for a heating receptacle or other object when extended.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Fig. 1 is a side elevational view of a grill constructed in accordance with one form of the present invention, the same being shown in collapsed condition with parts broken away and in section to more clearly illustrate structural details;

Fig. 2 is a similar view showing the grill extended to operative position; and

Fig. 3 is a transverse sectional view taken on the line 3—3 of Fig. 1.

Referring now more particularly to the accompanying drawing, the numeral 1 designates a rectangular pan or body member provided with sides and ends 2 and 3, respectively.

Pivotally connected to the sides 2 by rivets 4 adjacent their ends is a pair of channel cover members 5, the sides 5′ of which straddle the sides of the pan.

For storage or carrying purposes the members 5 are collapsed upon the top of the pan in abutted position as shown in Fig. 1, to form a case for the reception of a paper box or carton 10 provided with a top 11 containing solidified fuel tablets T.

To releasably hold the cover members in collapsed position the inner ends 9 of the sides 5′ are provided with nibs 6, which snap into recesses 7 formed in the sides 2 of the pan 1.

When extended, as shown in Fig. 2, the cover members assume a vertical position in which the lower ends 8 serve as legs for the pan, while the upper ends 9 support a can C or any other object to be heated.

In operation a tablet T is placed in the pan and ignited to heat the receptacle supported on the grill. During the heating operation the cover members 5 serve as shields against undue draft, and thus insure an even distribution of flame under the receptacle as indicated in dot and dash lines on Fig. 2. At the same time the spaced sides 5′ allow the entrance of sufficient air for the most efficient combustion of the tablet.

From the foregoing explanation considered in connection with the accompanying drawing it will be apparent that an exceedingly simple, compact and inexpensive collapsible grill has been devised for the effective use of solidified fuel tablets, and which serves as a neat compact case for conveniently carrying a substantial supply of tablets.

I claim the following:

1. A collapsible grill for burning solidified fuel tablets comprising: a rectangular body member having a bottom wall to support a solidified fuel tablet while it is burning and including side walls; a pair of channel cover members embracing the body member with the side walls of the cover members and the side walls of the body member in overlying relationship; means pivotally connecting the cover members intermediate their ends to the side walls of the body member so that the cover members may be pivoted from a collapsed position at which their inner ends are in juxtaposition to each other and their web portions conjointly form a cover for the body member, to opened substantially upright positions projecting below and above the body member to serve as legs for the body member and supports for a receptacle over the body member; and detent means for holding the cover members in their collapsed cover forming positions, said detent means comprising yieldingly engageable nibs and recesses on and in the overlying side walls.

2. A collapsible grill for carrying a box of solidified fuel tablets and supporting a tablet during burning thereof, comprising: a rectangular body member having a bottom wall to support a solidified fuel tablet while it is burning and including upstanding side walls; a pair of complementary cover members, each having an unbroken top wall and depending side walls, embracing the body member with the side walls of the cover members and the side walls of the body member in overlying relationship; means pivotally connecting the cover members intermediate their ends to the side walls of the body member so that the cover members may be pivoted from a collapsed position at which their inner ends are in juxtaposition to each other and their top walls conjointly form a substantially unbroken cover overlying the bottom wall of the body member to retain a box of tablets therein, to opened substantially upright positions projecting below and above the body member to serve as legs therefor and supports for a receptacle to be heated; upstanding end members on the bottom wall of the body member; and detent means for holding the cover members in one of several positions with respect to the body member, said detent means comprising yieldingly engageable nibs and recesses on and in the overlying side walls.

3. A collapsible grill for carrying and burning solidified fuel tablets, comprising: a substantially rectangular body member having a bottom wall and upstanding side walls; a pair of complementary cover members, each having an unbroken top wall and depending side walls, the top walls of the cover members together covering the entire area of the body member and the side walls of the cover members having overlying relationship with the side walls of the body member; pivots passing through the overlying side walls to pivotally connect the cover members intermediate their ends to the side walls of the body member so that the cover members may be swung from a collapsed position at which their top walls coact to provide a substantially unbroken cover for the body member, to opened substantially upright positions at which the top walls of the cover members are swung clear of the space over the bottom wall of the body member so as to enable free insertion and removal of a box of solidified fuel tablets into and from the body member; upstanding end members on the bottom wall of the body member; said cover members projecting below and above the body member when swung to their opened positions to serve as legs for the body member and supports for a receptacle to be heated by the burning of a tablet lying on the bottom wall of the body member; and detent means for holding the cover members in one of several positions with respect to the body member.

JOHN W. SPEAKER.